United States Patent
Kim et al.

(10) Patent No.: US 9,690,175 B2
(45) Date of Patent: Jun. 27, 2017

(54) METHOD OF CORRECTING DISTORTION OF IMAGE OVERLAP AREA, RECORDING MEDIUM, AND EXECUTION APPARATUS

(71) Applicant: CJ CGV CO., LTD., Seoul (KR)

(72) Inventors: Hwan Chul Kim, Seoul (KR); Su Ryeon Kang, Goyang-si (KR); Jihyung Kang, Hwaseong-si (KR)

(73) Assignee: CJ CGV CO., LTD., Seoul (KR)

(*) Notice: Subject to any disclaimer, the term of this patent is extended or adjusted under 35 U.S.C. 154(b) by 144 days.

(21) Appl. No.: 14/562,246

(22) Filed: Dec. 5, 2014

(65) Prior Publication Data

US 2015/0160540 A1 Jun. 11, 2015

(30) Foreign Application Priority Data

Dec. 9, 2013 (KR) ........................ 10-2013-0152598

(51) Int. Cl.
  G03B 21/14 (2006.01)
  G03B 37/04 (2006.01)
  H04N 9/31 (2006.01)

(52) U.S. Cl.
  CPC .......... *G03B 21/147* (2013.01); *G03B 37/04* (2013.01); *H04N 9/3147* (2013.01); *H04N 9/3182* (2013.01); *H04N 9/3185* (2013.01)

(58) Field of Classification Search
  CPC .... H04N 9/3185; H04N 9/317; H04N 9/3182; H04N 9/3147; H04N 9/3145; G03B 37/04; G03B 21/14; G03B 21/13
  USPC ......... 353/94, 30, 69; 345/1.3; 348/745, 806
  See application file for complete search history.

(56) References Cited

U.S. PATENT DOCUMENTS

| 5,136,390 A | * | 8/1992 | Inova | ........................ | H04N 5/57 348/383 |
| 6,753,923 B2 | * | 6/2004 | Gyoten | ................ | H04N 9/3147 348/383 |
| 6,814,448 B2 | * | 11/2004 | Ioka | ..................... | G03B 21/005 348/745 |

(Continued)

FOREIGN PATENT DOCUMENTS

| CN | 1471792 A | 1/2004 |
| CN | 101888511 A | 11/2010 |

(Continued)

OTHER PUBLICATIONS

International Search Report for PCT/KR2014/011862 dated Feb. 11, 2015.

(Continued)

*Primary Examiner* — William C Dowling
(74) *Attorney, Agent, or Firm* — Hauptman Ham, LLP

(57) ABSTRACT

Disclosed herein is a method of correcting the distortion of an image overlap area. The method includes identifying an overlap area between images projected by a plurality of projectors, obtaining information about the brightness of an image projected on the overlap area, and controlling the brightness of the image projected on the overlap area. Controlling the brightness of the image includes incorporating a transparency variable α into the image, and the transparency variable of an image projected by a specific projector is reduced toward remaining boundaries of the overlap area at a boundary of a non-overlap area and the overlap area.

10 Claims, 6 Drawing Sheets

(56) References Cited

U.S. PATENT DOCUMENTS

| | | | |
|---|---|---|---|
| 7,154,515 B2* | 12/2006 | Donahue | G06K 15/12 345/531 |
| 7,738,036 B2* | 6/2010 | Nijim | G03B 37/04 345/1.3 |
| 2007/0047033 A1 | 3/2007 | Furui | |
| 2011/0234921 A1* | 9/2011 | Ivashin | H04N 9/3147 348/745 |
| 2011/0310354 A1* | 12/2011 | Fujimori | G03B 21/13 353/31 |
| 2014/0354674 A1* | 12/2014 | Okamoto | G09G 5/02 345/590 |
| 2016/0088276 A1* | 3/2016 | Lin | H04N 9/3185 348/207.1 |

FOREIGN PATENT DOCUMENTS

| | | | |
|---|---|---|---|
| CN | 103037189 A | 4/2013 | |
| JP | 2006014356 A | 1/2006 | |
| JP | 2006084760 A | 3/2006 | |
| JP | 2007295026 A | 11/2007 | |
| JP | 2011217305 A | 10/2011 | |
| JP | 2012003041 A | 1/2012 | |

OTHER PUBLICATIONS

Chinese Office Action dated, Jul. 5, 2016 in connection with the Chinese Patent Application No. 201410749292.9.

* cited by examiner

METHOD OF CORRECTING DISTORTION OF IMAGE OVERLAP AREA, RECORDING MEDIUM, AND EXECUTION APPARATUS

CROSS REFERENCE TO RELATED APPLICATION

The present application claims the benefit of Korean Patent Application No. 10-2013-0152598 filed in the Korean Intellectual Property Office on Dec. 9, 2013, the entire contents of which are incorporated herein by reference.

BACKGROUND OF THE INVENTION

1. Technical Field

The present invention relates to an image processing method and, more particularly, to a method of correcting the distortion of an image, wherein images generally having a sense of unity are provided by correcting areas that are included in images projected by a plurality of projectors and that are overlapped.

2. Description of the Related Art

In a prior art, in order to play back images, such as movies and advertisements in a theater, a two-dimensional (2D) image is projected on a single screen disposed at the front of a movie theater. In such a system, audiences inevitably experience only 2D images.

A 3D image-related technology capable of providing a stereoscopic image to audiences has recently been developed. The 3D image technology is based on a principle that when different images enter the left eye and right eye of a person and are merged in a brain, the person is able to feel a three-dimensional effect even in a 2D image. In such a 3D image technology, two cameras on which different polarization filters are mounted are used to capture images, and glasses on which a polarization filter is mounted is used so that different images enter the left eye and right eye of a person when the person watches an image.

However, such a 3D technology may provide a stereoscopic image to a user, but is problematic in that a degree of immersion for an image itself is low because a user merely watches an image played back in a single screen. Furthermore, there is a problem in that the direction of a three-dimensional effect felt by audiences is limited to a direction in which a single screen is placed. Furthermore, the conventional 3D technology is problematic in that it may cause inconvenience for audiences who watch images because the audiences must wear glasses on which a polarization filter is mounted and that sensitive audiences may feel dizzy or sick because different images are forced to enter the left eye and right eye of a user.

Accordingly, a so-called "multi-projection system" (a preceding application of this application) capable of solving the problems of a conventional screening system based on a single screen was proposed. In this case, the "multi-projection system" means a system in which a plurality of projection surfaces (e.g., a screen and the surface of a wall) is disposed in the vicinity of stands and images having a sense of unity are played back on the plurality of projection surfaces so that audiences may have three-dimensional effects and immersive experiences. Furthermore, a "multi-projection theater" means a theater in which such a multi-projection system has been constructed. FIG. 1 illustrates an example of such a multi-projection system.

In order to effectively manage the multi-projection system, there is a need for technologies capable of effectively correcting images projected on a plurality of projection surfaces. The reason for this is that in the multi-projection system, an image correction process is very complicated and it is very likely that an error may occur because a plurality of images projected on a plurality of projection surfaces not on a single projection surface needs to be integrated and corrected and a method of correcting a plurality of images needs to be changed according to a change in the structure of a theater. Accordingly, there is a need for technologies that may assist the image correction process of such a multi-projection system.

In addition to such a multi-projection system, images may be projected on a single projection surface using a plurality of projectors. For example, images may be projected on a single projection surface using a plurality of projectors if the width of a projection surface is wide or if a length-breadth ratio of a projection surface is not handled by a single projector.

If images are to be projected using a plurality of projectors, it is very important to provide images having a sense of unity. In particular, images projected by respective projectors need to be corrected so that the boundaries of the images or the overlap area and non-overlap area of the images are not distinct.

SUMMARY OF THE INVENTION

Accordingly, the present invention has been made keeping in mind the above problems occurring in the prior art, and an object of the present invention is to play back images, projected by respective projectors, generally with a sense of unity when the images are projected by the plurality of projectors.

Another object of the present invention is to reduce a sense of difference in an overlap area and a non-overlap area and at the boundary of the overlap area and the non-overlap area by controlling various factors of images projected on an image overlap area.

Yet another object of the present invention is to prevent color unique to a projection surface from being mixed with an image and to display color unique to an image.

In an aspect of the present invention, a method of correcting the distortion of an image overlap area includes identifying an overlap area between images projected by a plurality of projectors, obtaining information about the brightness of an image projected on the overlap area, and controlling the brightness of the image projected on the overlap area, wherein controlling the brightness of the image includes incorporating a transparency variable a into the image, and the transparency variable of an image projected by a specific projector is reduced toward the remaining boundaries of the overlap area at the boundary of a non-overlap area and the overlap area.

In this case, in controlling the brightness of the image, a total sum of transparency variables of the images projected by the respective projectors may be 1 in the overlap area of the images.

In another embodiment of the present invention, the method may further include controlling at least one of the color and gamma values of each of the images, projected on the overlap area, again after controlling the brightness of the image.

Controlling at least one of the color and the gamma value again may include controlling the color so that the color distortion of the image projected on the overlap area is attenuated. In this case, the color distortion may be generated when color unique to an image projection surface is displayed and mixed with the image Furthermore, controlling at least one of the color and the gamma value again may include controlling the gamma value so that the gamma value has a negative correlation with brightness information In accordance with another embodiment of the present invention, controlling at least one of the color and the gamma value again may include providing a user with a user interface through which at least one of an color, saturation, and gamma value of the image may be controlled again, receiving an color, saturation, or gamma value control command from the user through the user interface, controlling the color, saturation, or the gamma value again in response to the control command, and correcting the image based on the controlled value.

In this case, controlling the color may include controlling the color by incorporating a variable, having a negative correlation with the transparency variable, into the saturation control command received from the user and converting the saturation control command and a color control command into RGB. The user interface may be provided in order to control the color depending on a Bezier curve.

The present invention may be implemented in the form of a computer-readable recording medium on which a program for executing the method of correcting the distortion of an image overlap area has been recorded and may be implemented in the form of an apparatus for executing the program.

DETAILED DESCRIPTION

Some exemplary embodiments of the present invention are described in detail with reference to the accompanying drawings.

Figure 1:
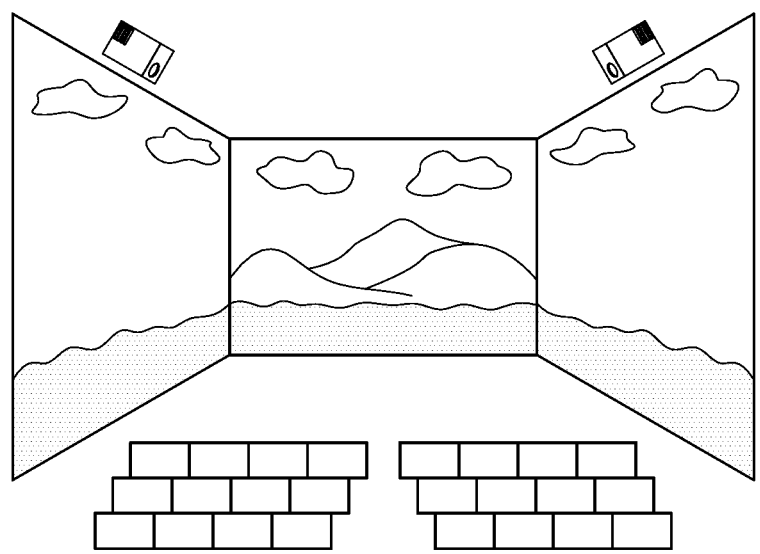
FIG. 1 is a diagram illustrating an example of the structure of a multi-projection system.
Figure 2:
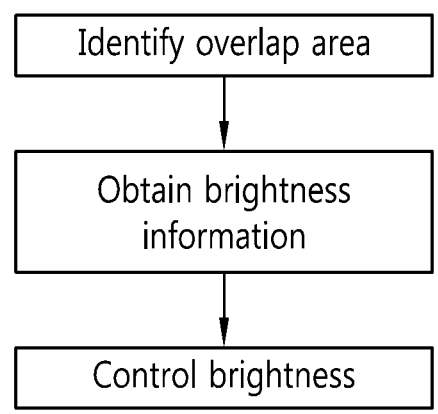
FIG. 2 is a flowchart illustrating a distortion correction method in accordance with an embodiment of the present invention.

FIG. 2 is a flowchart illustrating a distortion correction method in accordance with an embodiment of the present invention. The method of correcting the distortion of an image overlap area in accordance with an embodiment of the present invention includes identifying an overlap area between images projected by a plurality of projectors, obtaining information about the brightness of an image projected on the overlap area, and controlling the brightness of the image projected on the overlap area. Controlling the brightness of the image includes incorporating a transparency variable a into the image, and the transparency variable of an image projected by a specific projector is reduced toward the remaining boundaries of an overlap area at the boundary of a non-overlap area and the overlap area.

In order to check an overlap area between images, first, it is necessary to check that images projected by respective projectors are projected on which points of a projection surface. To this end, in an embodiment of the present invention, a reference image having a specific pattern (e.g., a lattice pattern) is projected on each of the projectors, and on which points on the projection surface is the reference image projected is determined. Thereafter, after the coordinates of a point overlapped between the reference images projected by the respective projectors are obtained, whether a location on the projection surface corresponds to an overlap area or a non-overlap area can be checked, and what the overlap area corresponds to which part within the image can also be checked. In order to easily check an overlap area, the reference images projected by the projectors that are consecutively disposed may have the same shape, but may have different colors.

In another embodiment, an area on a projection surface in which images are overlapped may be computed using information about an image projection area for each projector that is stored in a master device for controlling a plurality of projectors or that is computed. In the master device, that is, an apparatus for executing the method of correcting an image overlap area in accordance with an embodiment of the present invention, information about an image projection area, that is, information regarding that each of projectors projects an image on which area of a projection surface, may be computed by a variety of types of processors, or information about a projection area that has been previously computed may be stored in a storage device. Accordingly, the location and coordinates of an overlap area between images projected by a plurality of projectors may be obtained based on such information, and what a specific overlap area is overlapped by how many projectors (i.e., the degree of overlap) may also be computed.

Figure 3:
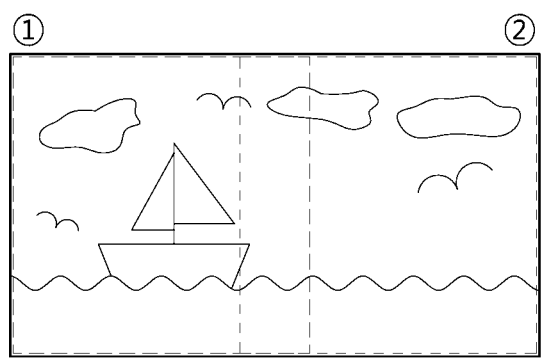
FIG. 3 is a diagram illustrating an example in which images are projected by a plurality of projectors.

FIG. 3 is a diagram illustrating an example in which images are projected by a plurality of projectors. FIG. 3 illustrates an example in which two projectors project images on a single projection surface. An image projected by a projector 1 is displayed on the left side of the projection surface, and an image projected by a projector 2 is displayed on the right side of the projection surface. An area in the middle of the projection surface in which dotted lines are overlapped corresponds to an overlap area, and the remaining areas correspond to non-overlap areas. In the example of FIG. 3, the images are played back with a sense of unity in the overlap area and the non-overlap areas in the state in which the method of correcting the distortion of an image overlap area in accordance with an embodiment of the present invention has been applied.

Figure 4:
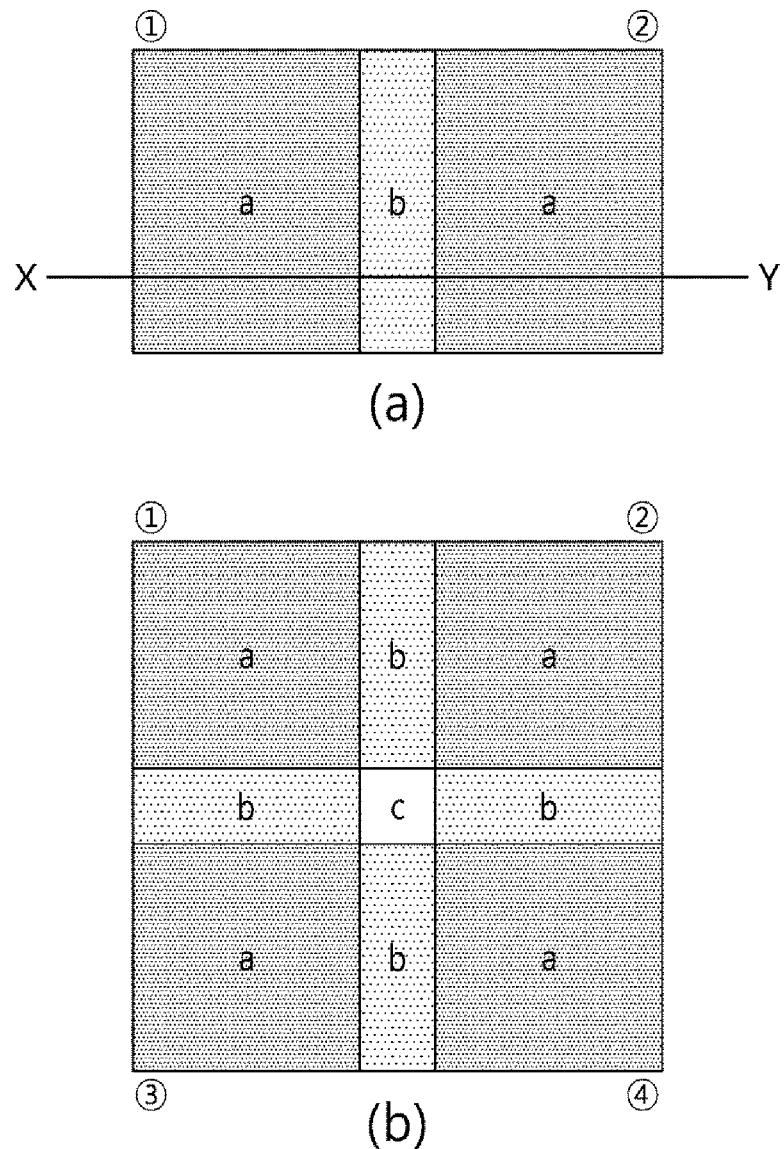
FIG. 4 is a diagram illustrating the degree of image overlap in an overlap area and a non-overlap area.

FIG. 4 is a diagram illustrating the degree of image overlap in an overlap area and a non-overlap area. FIG. 4(a) illustrates an example in which two projectors 1 and 2 project images, wherein "a" corresponds to a non-overlap area and "b" corresponds to an overlap area. Coordinates may be obtained based on the projection surface of the overlap area and the non-overlap area using the aforementioned method or a method to be described later, or coordinates may be obtained based on an image projected on a corresponding location.

FIG. 4(b) illustrates an example in which four projectors 1 to 4 project images, wherein "a" corresponds to a non-overlap area, "b" corresponds to an area where images projected by two of the four projectors are overlapped, and "c" corresponds to an area where images projected by the four projectors are overlapped. To distinguish a non-overlap area from an overlap area and vice versa is important, but it is also important to check that an overlap area is generated by how many projectors in order to practice an embodiment of the present invention. The reason for this is that a degree of correction is different depending on the degree that images are overlapped.

After an overlap area and non-overlap areas are checked and the coordinates of each area on a projection surface, coordinates on each projector, etc. are obtained, information about the brightness of an image projected on the overlap area is obtained.

In an embodiment of the present invention, in order to obtain brightness information, while an image is played back, the amount of light of an image projected at a specific spot of time (i.e., a specific frame) is extracted for each pixel. The amount of light may be extracted by analyzing the image or may be extracted by checking the amount of light corresponding to each of the areas (i.e., an overlap area and a non-overlap area) of all the images projected on a projection surface. If the amount of light of the image played back on the projection surface is to be checked, a separate device or system for calculating the amount of light is required, but there is an advantage in that actual brightness recognized by an eye of an audience may be accurately checked. In contrast, the method of analyzing an image itself projected by a projector is advantage in that information about the brightness of an image may be obtained although a light amount analysis device is not used.

The brightness of the image projected on the overlap area is controlled after information about the brightness of the image is obtained through the aforementioned process.

If images projected by respective projectors are overlapped, images in an overlap area become bright compared to a non-overlap area because the brightness of the images is added. Accordingly, a total sum of brightness of the images projected on the overlap area needs to be matched with that of non-overlap areas by controlling the brightness through projectors. If the brightness of an image is different in an overlap area and a non-overlap area, audiences may feel a sense of difference on a single screen projected by a plurality of projectors because they identify the overlap area and the non-overlap area. That is, an object of the present invention and an object of the multi-projection system to provide images having a sense of unity may not be achieved.

In an embodiment of the present invention in which the brightness of an image is controlled, a transparency variable $\alpha$ is incorporated into each of images projected on an overlap area by respective projectors. The transparency variable is a variable for controlling the brightness of an image projected by a projector and may have a value between 0 and 1. If the transparency variable is 0.5, it means that an image has brightness that is half the brightness of the original image.

In an embodiment of the present invention, in projecting an image by incorporating a transparency variable into the image, the transparency variable of an image projected by a specific projector is reduced toward the remaining boundaries of the overlap area at the boundary of a non-overlap area and an overlap area. This is described in detail with reference to FIG. 5.

Figure 5:
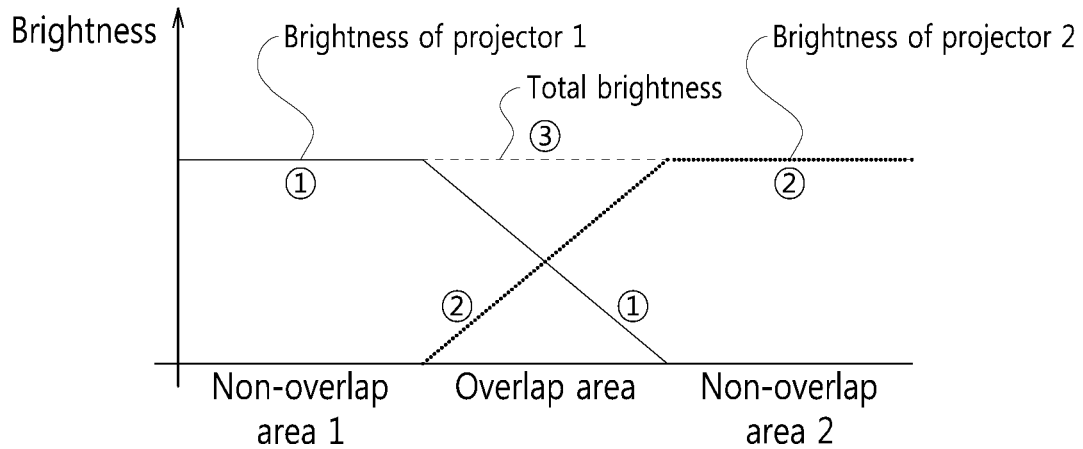
FIG. 5 is a diagram illustrating a comparison between brightness in an overlap area and brightness in a non-overlap area.

FIG. 5 is a diagram illustrating a comparison between brightness in an overlap area and brightness in a non-overlap area. FIG. 5 is a graph in which the brightness of an image is represented along X-Y of the projection surface illustrated in FIG. 4(a). A non-overlap area 1 and an overlap area mean areas on which an image is projected by a projector 1, and a non-overlap area 2 and the overlap area mean areas on which an image is projected by a projector 2. In the graph, a line indicated by ① is indicative of the brightness of the image projected by the projector 1, a line indicated by ② is indicative of the brightness of the image projected by the projector 2, and a line indicated by ③ is indicative of the brightness of the images projected on all the non-overlap area and the overlap area by the projector 1 and the projector 2.

If an overlap area is generated by two projectors as in FIG. 5, the sum of brightness of images projected on the overlap area by the two projectors may be made equal to that of a non-overlap area so that the brightness of each of the images projected on the overlap area becomes half the brightness of an image projected on a non-overlap area, that is, by setting a transparency variable in the entire overlap area to 0.5.

In an embodiment of the present invention, however, the brightness of an image is controlled so that the transparency variable is reduced toward the remaining boundaries of the overlap area at the boundary of a non-overlap area and an overlap area. If the former method is used, a sense of difference may occur at the boundary of the overlap area and the non-overlap area. That is, in the case of the non-overlap area 1, if the image projected by the projector 1 is played back and the images each having half brightness are projected with by the projectors 1 and 2 and are merged and played back at the boundary of the non-overlap area 1 and the overlap area, a sense of difference is generated due to some factors although the sum of the brightness of light is the same. That is, there may be a problem in that a boundary is significant although an overlap area should not be distinguished from a non-overlap area.

Accordingly, in an embodiment of the present invention, as illustrated in FIG. 5, an image from the projector 1 that projects the image on the non-overlap area 1 is chiefly projected on the boundary of the non-overlap area 1 and the overlap area, and the brightness of the image projected by the projector 1 is reduced toward a boundary on the opposite side (i.e., the boundary of the non-overlap area and the overlap area), but the brightness of an image projected by the projector 2 is increased. The brightness of an image is controlled by controlling a transparency variable incorporated into the image. As described above, the transparency variable is a variable for controlling the brightness of an image projected by a projector and may be controlled by controlling the projector or the master device for controlling the projector.

The present embodiment may be expressed as in Equation 1 below.

$$\text{Equation 1}$$

In Equation 1, $\Phi = \{\text{left; right; top and bottom boundary}\}$. That is, $\Phi$ means boundaries on the left, right, top, and bottom of the overlap area. $d_k$ means a vertical/horizontal distance from a specific location within an overlap area to a boundary. In accordance with Equation 1, when the boundary of the overlap area and the non-overlap area becomes nearer, $d_k$ becomes close to 0, but $\alpha$ becomes close to 1. That is, the transparency variable of an image projected by a specific projector at the boundary of an overlap area and a non-overlap area becomes close to 1.

In accordance with the present embodiment, images having a sense of unity may be played back in an overlap area and a non-overlap area. In particular, images may be united and played back even at the boundary of an overlap area and a non-overlap area. That is, a user is unable to recognize a boundary.

In an embodiment of the present invention, in controlling the transparency variable of an image, a total sum of the transparency variables of images projected by respective projectors is made 1 in an overlap area between images. The present embodiment is described with reference to FIG. 5. The sum ③ of the brightness ① of the image projected by the projector 1 and the brightness ② of the image projected by the projector 2 is always made constant.

For example, if a specific pixel within an overlap area is overlapped three times and projected due to images projected by three projectors, the images are played back with brightness that is three times brighter than the original brightness because the colors of the projectors are added. In order to prevent such a problem, each of the images projected by the projectors may be displayed with the original brightness by projecting the image by only ⅓ of the original brightness so that images with the same brightness are displayed in an overlap area and a non-overlap area. This may be expressed as in Equation 2 below.

$$C = \Sigma \alpha_i * C, \ \alpha_i = 1 \quad (2)$$

In Equation 3, C is color that is finally represented in each pixel, and α is a transparency variable in each pixel.

A transparency variable derived using Equation 1 is applied to an image applied to an image projected on an overlap area by each projector (i.e., $\alpha_i*C$). In this case, a total sum of transparency variables in each point is 1 (i.e., $\Sigma \alpha_i=1$) so that the brightness of an image in all the areas of the overlap area becomes constant (i.e., C).

Figure 6:
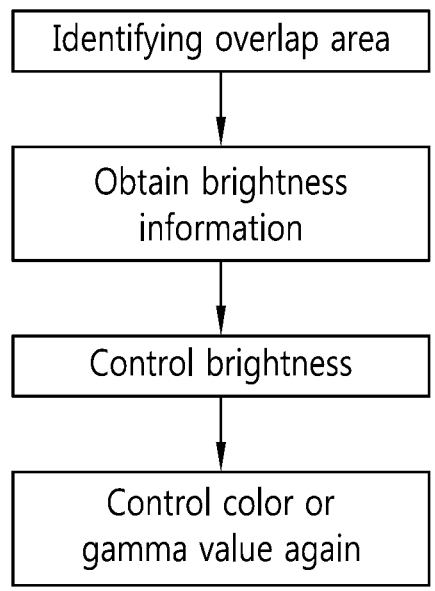
FIGS. 6 and 7 are flowcharts illustrating a distortion correction method in accordance with another embodiment of the present invention.

In accordance with an embodiment of the present invention, the method of correcting the distortion of an image overlap area may further include controlling at least one of the color and gamma values of an image, projected on an overlap area, again after controlling the transparency variable of the image. The method of correcting the distortion of an image overlap area in accordance with the present embodiment may be practiced according to a flowchart of FIG. 6.

Although the transparency variables of images projected by respective projectors are controlled so that they are 1 in the entire overlap area as in the aforementioned embodiment, the brightness of images projected on an actual overlap area may not be the same. That is, although the transparency variable of an image projected by the projector 1 is 0.8 at a specific spot of the overlap area and the transparency variable of an image projected by the projector 2 is 0.2 at the specific spot of the overlap area, an image having a sense of difference from an image played back in another area may be played back. Such a problem may occur when projectors have different gamma values or the color of an image is not directly proportional to the brightness of the image.

Accordingly, an embodiment of the present invention further includes correcting the RGB of an image projected on an overlap area or controlling the gamma value of the image again so that the distortion of an image in the overlap area is corrected by controlling the RGB and the gamma value as well as brightness.

In an embodiment of the present invention, controlling at least one of the color and gamma values of an image again may include controlling the color of an image projected on an overlap area so that the color distortion of the image is attenuated.

In the present embodiment, a color distortion according to control of brightness is corrected. As a transparency variable becomes close to 0, that is, as the brightness of a projected image becomes weak, color unique to the image is distorted. The reason for this is that the color of an image is greatly reduced compared to a case where the brightness of the image or the color of a projection surface is mixed as the brightness of the image is reduced.

In an embodiment of the present invention, in particular, the color of an image is controlled so that a color distortion generated because color unique to an image projection surface is displayed and mixed with an image as the brightness of the image is reduced. For example, if color of a projection surface is blue gray, blue is further significant when an image is dark (i.e., as a transparency variable becomes close to 0). In such a case, in an embodiment of the present invention, the color of the image is controlled again so that blue is reduced.

In controlling at least one of the color and gamma values of an image again, a color control variable having a negative correlation with a transparency variable is incorporated into the image so that a color distortion occurring in a dark image is corrected. For example, a value, such as (1−α) having a negative correlation with a transparency variable α, may be set as the color control variable.

In an embodiment of the present invention, controlling at least one of the color and gamma values of an image again may include controlling the gamma value so that it has a negative correlation with brightness information. The gamma value is a variable incorporated in order to linearly change a human's visual ability to nonlinearly sense a change of a stimulus, in particular, a human's detectibility for brightness. That is, the gamma value is a variable incorporated in order to correct that brightness of 0.5 is not recognized as half the original brightness of 1, but is nonlinearly recognized. Such a gamma value is applied to an image projector, such as a projector, and an image player. If images from a plurality of projectors are projected on an overlap area, the images are linearly overlapped, whereas a distortion may occur in the brightness of an image because a gamma value has a non-linear characteristic. Accordingly, in the present embodiment, an image distortion attributable to image overlap is corrected by controlling a gamma value after the image overlap.

Figure 7:
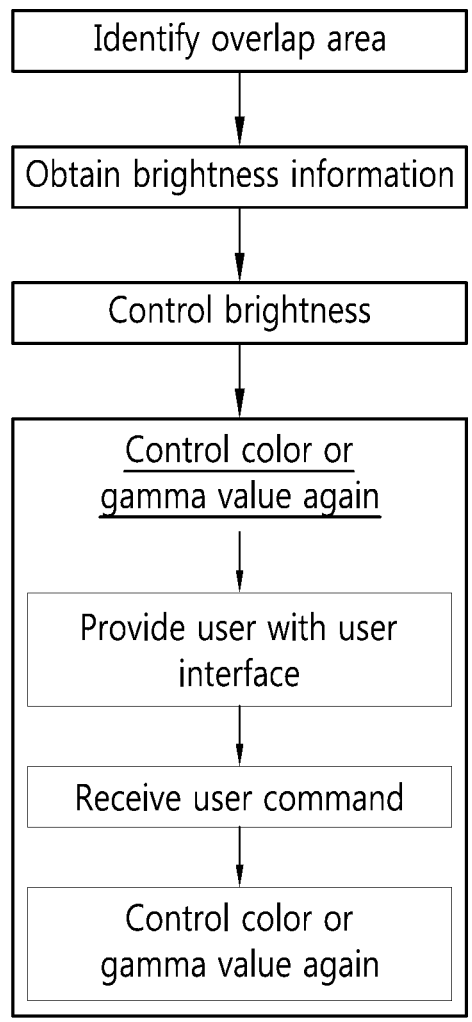

Another embodiment of the present invention is described with reference to FIG. 7.

Controlling at least one of the color of an image and a gamma value again in accordance with an embodiment of the present invention may include providing a user with a user interface through which at least one of the color, saturation, and gamma value of an image is controlled again, receiving a color, saturation, or gamma value control command through the user interface from the user, controlling the color, saturation, or gamma value again in response to the control command, and correcting the image based on the controlled value.

In the present embodiment, color correction or gamma value correction is performed based on a command received from a user. The distortion of an image is corrected directly based on a human' sight unlike in the aforementioned embodiment in which an image is corrected based on a transparency variable or a color control variable.

In accordance with the present embodiment, a user is provided with the user interface through which the user is able to control several variables. When the user controls a master device or projector in which an embodiment of the present invention has been implemented so that an image distortion complies with the sight of the user by controlling the user interface, that is, so that the user may not visually feel a difference between an overlap area and a non-overlap area, the master device or projector receives a corresponding command and thus controls color, saturation, or a gamma value again. The present embodiment is advantageous in that an image distortion can be corrected in such a way as to comply with a human' sight although it is not corrected based on numerical values because the present embodiment is based on a human' sight.

Figure 8:
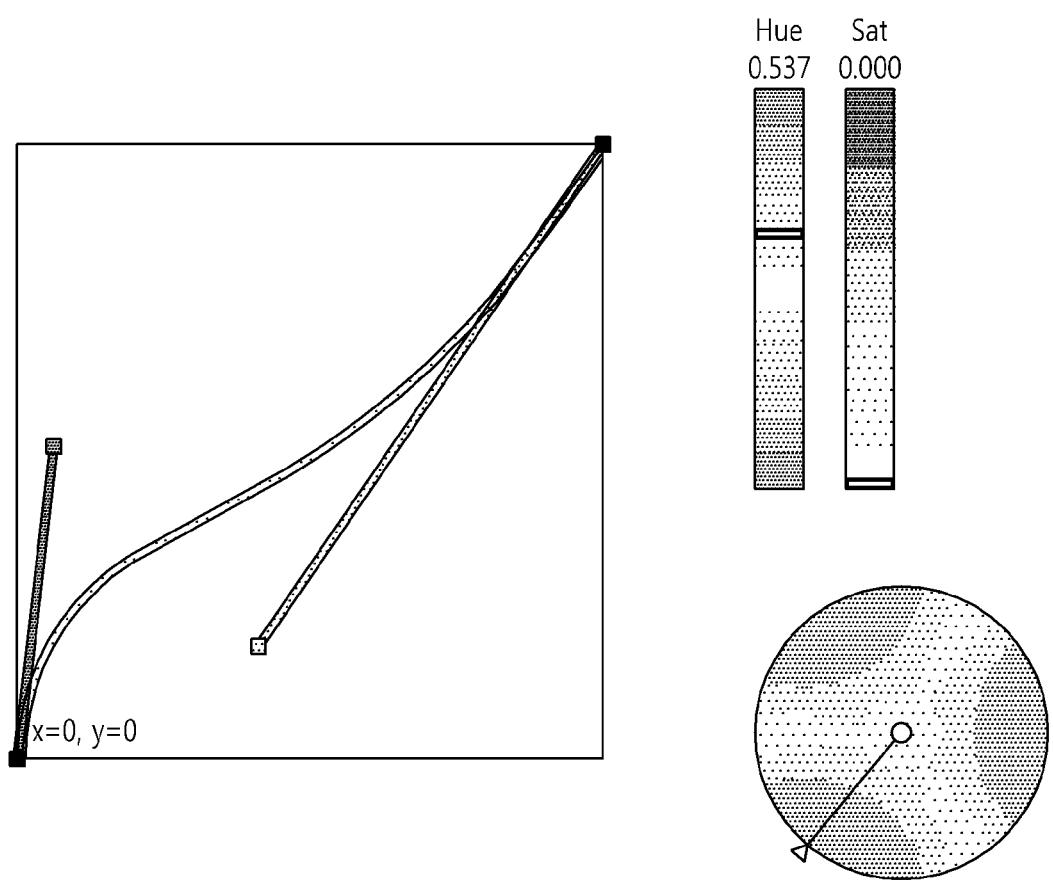
FIG. 8 is a screen illustrating an example of a user interface in accordance with the distortion correction method according to an embodiment of the present invention.

FIG. 8 is a screen illustrating an example of a user interface according to the embodiment. A user may control color, saturation, and a gamma value using the user interface of FIG. 8.

In this case, correcting an image includes incorporating a variable, having a negative correlation with a transparency variable, into a saturation control command received from a user and controlling color by converting the saturation control command and a color control command into RGB. An image is corrected by incorporating a value, obtained by converting RGB and Hue, Saturation, Bright (HSV) Values received from a user into RGB, into the image. In this case, saturation may be multiplied by a variable (e.g., $1-\alpha$) having a negative correlation with a transparency variable, and HSV to RGB conversion is performed. Accordingly, an image can be corrected by incorporating a change of the transparency variable, that is, a change of saturation according to a change of brightness, into the image.

In the present embodiment, the user interface may be further provided in order to control color again depending on a Bezier curve. In FIG. 8, color input when a color control command is input may be changed depending on a Bezier curve so that an image distortion is smoothly corrected.

The present invention may be implemented in the form of a program for executing the method of correcting the distortion of an image overlap area and includes a computer-readable recording medium on which such a program has been recorded. In this case, the recording medium should be construed as having a wide meaning including a server, a computer, etc. including a storage space, as well as being a recording medium of a narrow meaning, such as an HDD, a CD, or a magnetic disk.

Furthermore, the present invention includes an apparatus for executing such a program, and the execution apparatus (i.e., the master device) may include a projector controller, a computer, a server, etc., for example. In this case, in the method of correcting an image overlap area in accordance with an embodiment of the present invention, elements for executing the method, for example, determination and operation may be performed by a Central Processing Unit (CPU), the storage of information may be performed by a storage element (e.g., a database) within the apparatus, and a user interface may be provided to a user through a display device and may receive user commands through an input device.

In accordance with an embodiment of the present invention, when images are projected using a plurality of projectors, images generally having a sense of unity can be played back. In particular, a sense of difference between an overlap area and a non-overlap area can be reduced by controlling various factors of images projected on the overlap area or the non-overlap area.

The embodiments of the present invention have been disclosed for illustrative purposes, and those skilled in the art will appreciate that various modifications, additions and substitutions are possible, without departing from the scope and spirit of the invention as disclosed in the accompanying claims.

What is claimed is:

1. A method of correcting a distortion of an image overlap area, comprising:
   identifying an overlap area between images projected by a plurality of projectors;
   obtaining information about a brightness of an image projected on the overlap area;
   controlling the brightness of the image projected on the overlap area; and
   controlling at least one of a color and gamma value of the image projected on the overlap area so that a color distortion of the image projected on the overlap area is attenuated,
   wherein
   the controlling the brightness of the image comprises incorporating a transparency variable $\alpha$ into the image projected on the overlap area, and
   the transparency variable of an image projected by a specific projector is reduced toward remaining boundaries of the overlap area at a boundary of a non-overlap area and the overlap area, and
   wherein the color distortion is generated when color unique to an image projection surface is displayed and mixed with the image projected on the overlap area.

2. The method of claim 1, wherein in the controlling the brightness of the image, a total sum of transparency variables of the images projected by respective projectors is 1 in the overlap area of the images.

3. The method of claim 1, wherein the controlling at least one of a color and gamma value controls at least one of a color and gamma value of each of the images, projected on the overlap area, after the controlling the brightness of the image.

4. The method of claim 1, wherein the controlling at least one of a color and gamma value comprises controlling the color by incorporating a color control variable, having a negative correlation with the transparency variable, into the color.

5. The method of claim 1, wherein the controlling at least one of a color and gamma value comprises controlling the gamma value so that the gamma value has a negative correlation with brightness information.

6. The method of claim 1, wherein the controlling at least one of a color and gamma value comprises:
   providing a user with a user interface through which at least one of a color, saturation, and gamma value of the image is controlled;
   receiving a color, saturation, or gamma value control command from the user through the user interface;
   controlling the color, saturation, or the gamma value in response to the received control command; and
   correcting the image based on the controlled value.

7. The method of claim 6, wherein the controlling the color comprises controlling the color by incorporating a variable, having a negative correlation with the transparency variable, into the saturation control command received from the user and converting the saturation control command and the color control command into RGB.

8. The method of claim 6, wherein the user interface is provided in order to control the color depending on a Bezier curve.

9. A non-transitory computer-readable recording medium on which a program for executing the method of correcting a distortion of an image overlap area according to claim 1 has been recorded.

10. An apparatus for executing a program for executing the method of correcting a distortion of an image overlap area according to claim 1.

\* \* \* \* \*